United States Patent
Shechtman et al.

(10) Patent No.: US 11,556,782 B2
(45) Date of Patent: Jan. 17, 2023

(54) STRUCTURE-PRESERVING ATTENTION MECHANISM IN SEQUENCE-TO-SEQUENCE NEURAL MODELS

(71) Applicant: International Business Machines Corporation, Armonk, NY (US)

(72) Inventors: Vyacheslav Shechtman, Haifa (IL); Alexander Sorin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 16/575,432

(22) Filed: Sep. 19, 2019

(65) Prior Publication Data

US 2021/0089877 A1    Mar. 25, 2021

(51) Int. Cl.
*G10L 25/30* (2013.01)
*G06N 3/08* (2006.01)
(Continued)

(52) U.S. Cl.
CPC ............... *G06N 3/08* (2013.01); *G06N 3/04* (2013.01); *G10L 13/04* (2013.01); *G10L 25/30* (2013.01)

(58) Field of Classification Search
CPC ................. G10L 25/30; G10L 13/04
(Continued)

(56) References Cited

U.S. PATENT DOCUMENTS

2016/0140953 A1* 5/2016 Kwon ............... G10L 13/04
                                                        704/260
2019/0122651 A1    4/2019 Arik
(Continued)

FOREIGN PATENT DOCUMENTS

| CN | 107832310 | 3/2018 |
|----|-----------|--------|
| WO | 2018032765 | 2/2018 |
| WO | 20181836502 W | 10/2018 |

OTHER PUBLICATIONS

Douglas O'Shaughnessy, "Speech Enhancement," in Speech Communications: Human and Machine, IEEE, 2000, pp. 337-366, doi: 10.1109/9780470546475.ch9. (Year: 2000).*

Y. Lu, M. Dong and Y. Chen, "Implementing Prosodic Phrasing in Chinese End-to-end Speech Synthesis," ICASSP 2019—2019 IEEE International Conference on Acoustics, Speech and Signal Processing (ICASSP), 2019, pp. 7050-7054, doi: 10.1109/ICASSP.2019.8682368. (Year: 2019).*

(Continued)

*Primary Examiner* — Bharatkumar S Shah
(74) *Attorney, Agent, or Firm* — Dvir Gassner (57) ABSTRACT

In a trained attentive decoder of a trained Sequence-to-Sequence (seq2seq) Artificial Neural Network (ANN): obtaining an encoded input vector sequence; generating, using a trained primary attention mechanism of the trained attentive decoder, a primary attention vectors sequence; for each primary attention vector of the primary attention vectors sequence: (a) generating a set of attention vector candidates corresponding to the respective primary attention vector, (b) evaluating, for each attention vector candidate of the set of attention vector candidates, a structure fit measure that quantifies a similarity of the respective attention vector candidate to a desired attention vector structure, (c) generating, using a trained soft-selection ANN, a secondary attention vector based on said evaluation and on state variables of the trained attentive decoder; and generating, using the trained attentive decoder, an output sequence based on the encoded input vector sequence and the secondary attention vectors.

20 Claims, 4 Drawing Sheets

(51) Int. Cl.
    *G06N 3/04* (2006.01)
    *G10L 13/04* (2013.01)
(58) Field of Classification Search
    USPC .......................................................... 704/25
    See application file for complete search history.

(56) References Cited

U.S. PATENT DOCUMENTS

2021/0005183 A1* 1/2021 Lee .................. G10L 15/16
2021/0035562 A1* 2/2021 Lee .................. G06N 3/08

OTHER PUBLICATIONS

Douglas O'Shaughnessy, "Speech Enhancement," in Speech Communications: Human and Machine , IEEE, 2000, pp. 337-366, doi: 10.1109/9780470546475.ch9. (Year: 2000) (Year: 2000).*
Y. Lu, M. Dong and Y. Chen, "Implementing Prosodic Phrasing in Chinese End-to-end Speech Synthesis," ICASSP 2019—2019 IEEE International Conference on Acoustics, Soeech and Signal Processing (ICASSP), 2019, pp. 7050-7054, doi: 10.1109/ICASSP.2019.8682368. (Year: 2019) (Year: 2019).*
J. Michael, R. Labahn, T. Grüning and J. Zöllner, "Evaluating Sequence-to-Sequence Models for Handwritten Text Recognition," 2019 International Conference on Document Analysis and Recognition (ICDAR), 2019, pp. 1286-1293, doi: 10.1109/ICDAR.2019.00208. (Year: 2019).*
Jing-Xuan Zhang et al., "Forward attention in sequence-to-sequence acoustic modeling for speech synthesis", arXiv, Jul. 18, 2018.
Bing Su et al., "Order-preserving Wasserstein Distance for Sequence Matching", IEEE Conference on Computer Vision and Pattern Recognition (CVPR), Jul. 21-26, 2017.
Xiaolian Zhu et al., "Pre-Alignment Guided Attention for Improving Training Efficiency and Model Stability in End-to-End Speech Synthesis", IEEE Access (vol. 7), Apr. 30, 2019, pp. 65955-65964.
WIPO, International Search Report of PCT Patent Application No. PCT/EP2020/076185, dated Feb. 12, 2021.

* cited by examiner

STRUCTURE-PRESERVING ATTENTION MECHANISM IN SEQUENCE-TO-SEQUENCE NEURAL MODELS

BACKGROUND

The invention relates to the field of Sequence-to-Sequence (seq2seq) Artificial Neural Networks (ANNs).

The use of neural models (i.e., ANNs) for seq2seq learning and inference was first introduced in 2014 by I. Sutskever, O. Vinyals, and Q. V. Le, "Sequence to sequence learning with neural networks," Advances in Neural Information Processing Systems 27 (NIPS 2014). Seq2seq neural models are able to map input sequences to output sequence without a-priori knowledge of the length of the input sequence. Today, seq2seq neural models are being used for tasks such as machine translation, speech recognition, text-to-speech (TTS), video captioning, text summarization, textual entailment, question answering, chat bots, and more.

Seq2seq neural models typically use an encoder-decoder architecture. Commonly, the encoder and decoder each include a Recurrent Neural Network (RNN), such as a Long Short-Term Memory (LSTM) or a Gated Recurrent Unit (GRU) network. In the encoder, the input sequence is encoded into compact representations usually referred to as "state vectors" or "context vectors." These serve as input to the decoder, which generates a suitable output sequence. The decoder operates at discrete iterations ("time steps"), and outputs each symbol of the output sequence in one such time step.

Attention mechanisms play an important role in seq2seq neural models. In many tasks, not all symbols in the input sequence should be treated equally in order to generate a correct output sequence. For example, in machine translation, a word appearing in the input sequence may have several different meanings; to translate it into the right word in a second language, its correct meaning must be contextually inferred from other words in the input sequence. The attention mechanism can direct the seq2seq neural model to rely on the correct words in the input sequence for understanding the context of the problematic word. This is typically performed by biasing the context vectors prior to their processing by the decoder. Attention weight vectors (also "alignment vectors") are provided, each determining the relative attention (also "alignment") of one output symbol of the decoder to the whole input sequence of the decoder. A linear combination of the encoded input sequence vectors, with their corresponding weights taken from the alignment vector, represents the context vector that is then processed by the decoder.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising, in a trained attentive decoder of a trained Sequence-to-Sequence (seq2seq) Artificial Neural Network (ANN): obtaining an encoded input vector sequence; generating, using a trained primary attention mechanism of the trained attentive decoder, a primary attention vectors sequence; for each primary attention vector of the primary attention vectors sequence: (a) generating a set of attention vector candidates corresponding to the respective primary attention vector, (b) evaluating, for each attention vector candidate of the set of attention vector candidates, a structure fit measure that quantifies a similarity of the respective attention vector candidate to a desired attention vector structure, (c) generating, using a trained soft-selection ANN, a secondary attention vector based on said evaluation and on state variables of the trained attentive decoder; and generating, using the trained attentive decoder, an output sequence based on the encoded input vector sequence and the secondary attention vectors.

Another embodiment relates to a system comprising: (i) at least one hardware processor; and (ii) a non-transitory computer-readable storage medium having program code embodied therewith, the program code executable by said at least one hardware processor to perform the following instructions in a trained attentive decoder of a trained Sequence-to-Sequence (seq2seq) Artificial Neural Network (ANN): obtaining an encoded input vector sequence; generating, using a trained primary attention mechanism of the trained attentive decoder, a primary attention vectors sequence; for each primary attention vector of the primary attention vectors sequence: (a) generating a set of attention vector candidates corresponding to the respective primary attention vector, (b) evaluating, for each attention vector candidate of the set of attention vector candidates, a structure fit measure that quantifies a similarity of the respective attention vector candidate to a desired attention vector structure, (c) generating, using a trained soft-selection ANN, a secondary attention vector based on said evaluation and on state variables of the trained attentive decoder; and generating, using the trained attentive decoder, an output sequence based on the encoded input vector sequence and the secondary attention vectors.

A further embodiment relates to a computer program product comprising a non-transitory computer-readable storage medium having program code embodied therewith, the program code executable by at least one hardware processor to perform the following instructions in a trained attentive decoder of a trained Sequence-to-Sequence (seq2seq) Artificial Neural Network (ANN): obtaining an encoded input vector sequence; generating, using a trained primary attention mechanism of the trained attentive decoder, a primary attention vectors sequence; for each primary attention vector of the primary attention vectors sequence: (a) generating a set of attention vector candidates corresponding to the respective primary attention vector, (b) evaluating, for each attention vector candidate of the set of attention vector candidates, a structure fit measure that quantifies a similarity of the respective attention vector candidate to a desired attention vector structure, (c) generating, using a trained soft-selection ANN, a secondary attention vector based on said evaluation and on state variables of the trained attentive decoder; and generating, using the trained attentive decoder, an output sequence based on the encoded input vector sequence and the secondary attention vectors.

In some embodiments, said generating of the output sequence comprises: generating input context vectors based on the encoded input vector sequence and on the secondary attention vectors; and generating, using the trained attentive decoder, the output sequence based on the input context vectors.

In some embodiments, said generating of the set of attention vector candidates comprises: obtaining at least one of: a current primary attention vector, a set of previous primary attention vectors, and a set of previous secondary attention vectors; and augmenting the at least one obtained vector with additional attention vectors, by at least one of shuffling and shifting the contents of the at least one obtained vector.

In some embodiments, said generating of the set of attention vector candidates comprises: obtaining at least one of: a current primary attention vector, a set of previous primary attention vectors, and a set of previous secondary attention vectors; and augmenting the at least one obtained vector with additional attention vectors, by calculating the additional attention vectors to comply with the desired attention vector structure.

In some embodiments, the structure fit measure is based on at least one of: a smooth maximum, kurtosis, skewness, entropy, a ratio between L2-norm and L1-norm.

In some embodiments, said generating of the secondary attention vector comprises: applying scalar mapping to the evaluated structure fit measures, to produce a mapped structure fit measures vector; providing a trained sequential ANN having: alternating linear and non-linear layers, and a terminating linear layer; applying the trained sequential ANN to the state variables of the trained attentive decoder, and adding an output vector of said applying to the mapped structure fit measures vector, to produce an interim vector; providing the interim vector to a softmax layer, to produce weights for the set of attention vector candidates; and forming the secondary attention vector by combining the set of attention vector candidates according to their weights.

In some embodiments, said generating of the secondary attention vector comprises: applying scalar mapping to the evaluated structure fit measures, to produce mapped structure fit measures; defining multiple subsets of attention vector candidates and their corresponding mapped structure fit measures; for each of the multiple subsets: (a) providing a trained sequential ANN having: alternating linear and non-linear layers, and a terminating linear layer, (b) applying the trained sequential ANN to the state variables of the trained attentive decoder, and adding an output vector of said applying to the mapped structure fit measures of the respective subset, to produce an interim vector, (c) providing the interim vector to a softmax layer, to produce weights for the subset of attention vector candidates, (d) forming a subset attention vector candidate by combining the attention vector candidates of the respective subset according to their weights, (e) evaluating, for the subset attention vector candidate, a subset structure fit measure that quantifies a similarity of the subset attention vector candidate to a desired attention vector structure, and (f) applying scalar mapping to the evaluated subset structure fit measure, to produce a mapped subset structure fit measure; providing an additional trained sequential ANN having: alternating linear and non-linear layers, and a terminating linear layer; applying the additional trained sequential ANN to the state variables of the trained attentive decoder, and adding an output vector of said applying of the additional trained sequential ANN to a vector of the mapped subset structure fit measures, to produce an intermediate vector; providing the intermediate vector to a softmax layer, to produce weights for the subset attention vector candidates; and forming the secondary attention vector by combining the subset attention vector candidates according to their weights.

In some embodiments, the trained primary attention mechanism is an additive attention mechanism.

In some embodiments, the seq2seq ANN is configured for a text-to-speech task, and the method further comprises, or the instructions further comprise: operating a vocoder to synthesize speech from the output sequence; and modifying the secondary attention vector before or during said generating of the output sequence, to affect at least one prosody parameter of the synthesized speech.

In some embodiments, the at least one prosody parameter is selected from the group consisting of: intonation, stress, tempo, rhythm, pauses, and chunking.

In some embodiments, the method further comprises, or the instructions further comprise: receiving a definition of the desired attention vector structure from a user.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A structure-preserving, secondary attention mechanism for seq2seq ANN models (hereinafter "models") is disclosed herein. This secondary attention mechanism, which may be used to substitute the model's preexisting ("primary") attention mechanism, may improve alignment stability of the model and is especially beneficial when controlling various parameters of an output sequence of the model during inference. It is also of benefit for improving alignment convergence during learning (also "training") of the model.

Advantageously, the structure-preserving secondary attention mechanism is capable of providing secondary attention vectors that, on one hand, bias the context vectors of the decoder differently than the primary attention mechanism of the model, and, on the other hand, preserve a certain desired structure. Preservation of a desired structure is important for ensuring accurate prediction of output sequences by the model. A secondary attention mechanism that is generated without adhering to proper structure, is unlikely to improve the primary attention mechanism.

A desired qualitative structure of attention matrix may be either defined by a user (e.g., a developer of the model, with knowledge on attention mechanism characteristics that fit the case at hand) or be hard-coded. By way of example, a text-to-speech model may require a sparse and monotonous structure for its attention matrices, in order to generate quality output sequences. This structure entails sparse and unimodal matrix rows (i.e., vectors), with each row having its peak location (e.g. argmax) not lower than that of the preceding row.

Considering the desired structure of the attention matrix, and hence for its vectors, a corresponding structure fit measure may be evaluated for a set of generated attention vector candidates. The structure fit measure quantifies the fit of each candidate to the desired qualitative attention vector structure. The structure fit measure should be differentiable, in order to be integrated into the main model. For example, a soft-maximum operator (e.g., LogSumExp) output can serve as a rough structure fit measure for unimodal sparse attention vectors.

The candidates in the set may be obtained, for example, from a current primary attention vector, a set including one or more previous primary attention vectors, and/or a set including one or more previous secondary attention vectors (namely, ones selected as secondary attention vectors in one or more previous iterations of the decoder), to name a few examples.

Optionally, these obtained candidates are augmented with one or more additional attention vectors, to increase the number of candidates available for a later evaluation. The additional attention vectors may be generated, for example, by shuffling and/or shifting the contents of one or more of the obtained candidates. Another option is to calculate one or more additional attention vectors de novo, based on the desired structure.

Next, a secondary attention vector may be obtained by a soft-selection, i.e., generated as a convex linear combination of the obtained candidate vectors and optionally also of the augmented candidates. Weights for the convex linear combination may be generated by a trained, sequential ANN that is fed at least with the evaluated structure fit measures of the candidates. This ANN may be trained jointly with the main seq2seq network, preserving the main network's original training loss.

Secondary attention vectors generated per this technique can then be utilized by the model in learning and/or inference, substituting the primary attention vectors in the calculation of the input context vectors that are fed to the rest of the decoder and used to generate an output sequence.

Figure 1:
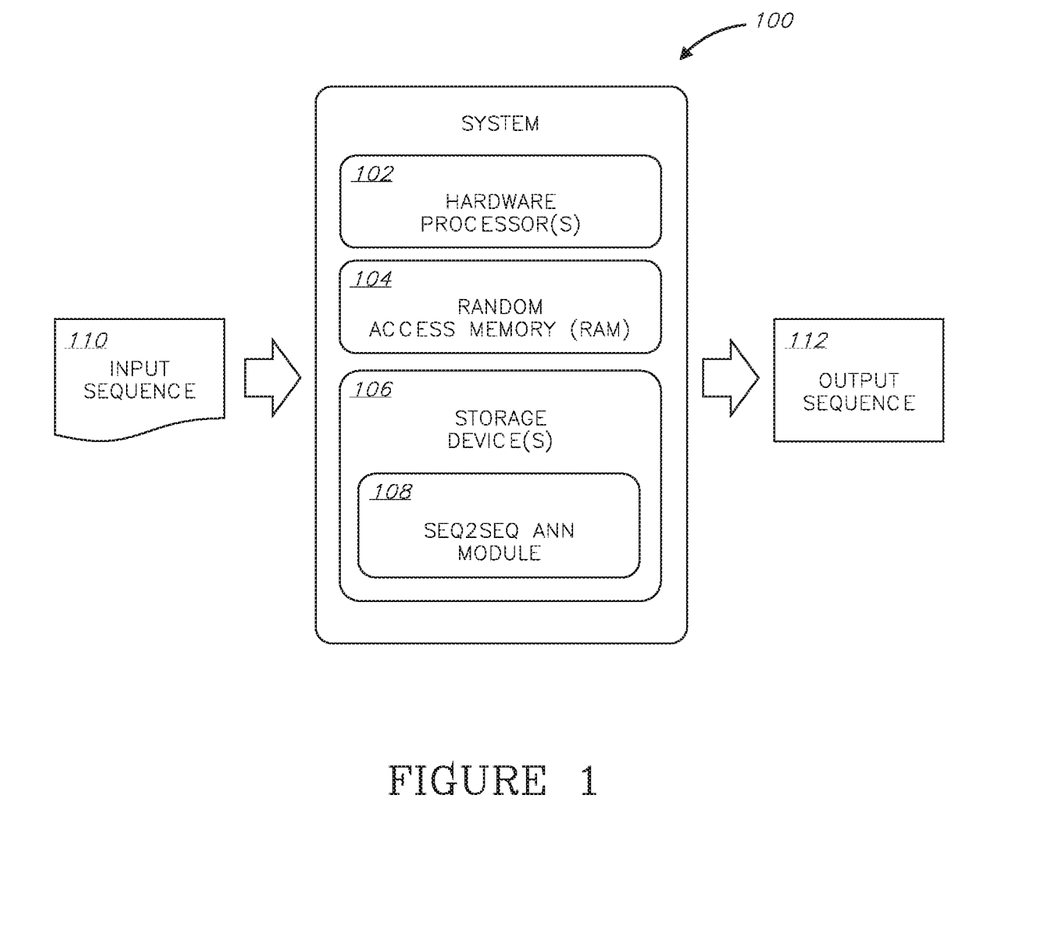
FIG. 1 is a block diagram of an exemplary system for operating a seq2seq ANN, according to an embodiment.

Reference is now made to FIG. 1, which shows a block diagram of an exemplary system 100 for operating a seq2seq ANN, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a seq2seq ANN module 108. Also included is an operating system having various software components and/or drivers for controlling and managing general system tasks (e.g., memory management, storage device control, power management, etc.), facilitating communication between various hardware and software components, and running seq2seq ANN module 108.

System 100 may operate by loading instructions of seq2seq ANN module 108 into RAM 104 as they are being executed by processor(s) 102. The instructions of seq2seq ANN module 108 may cause system 100 to receive an input sequence 110, process it, and produce an output sequence 112.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components.

System 100 may include any additional component enabling it to function as an operable computer system, such as a motherboard, data busses, power supply, a network interface card, etc. (not shown). Components of system 100 may be co-located or distributed (e.g., in a distributed computing architecture).

Figure 2:
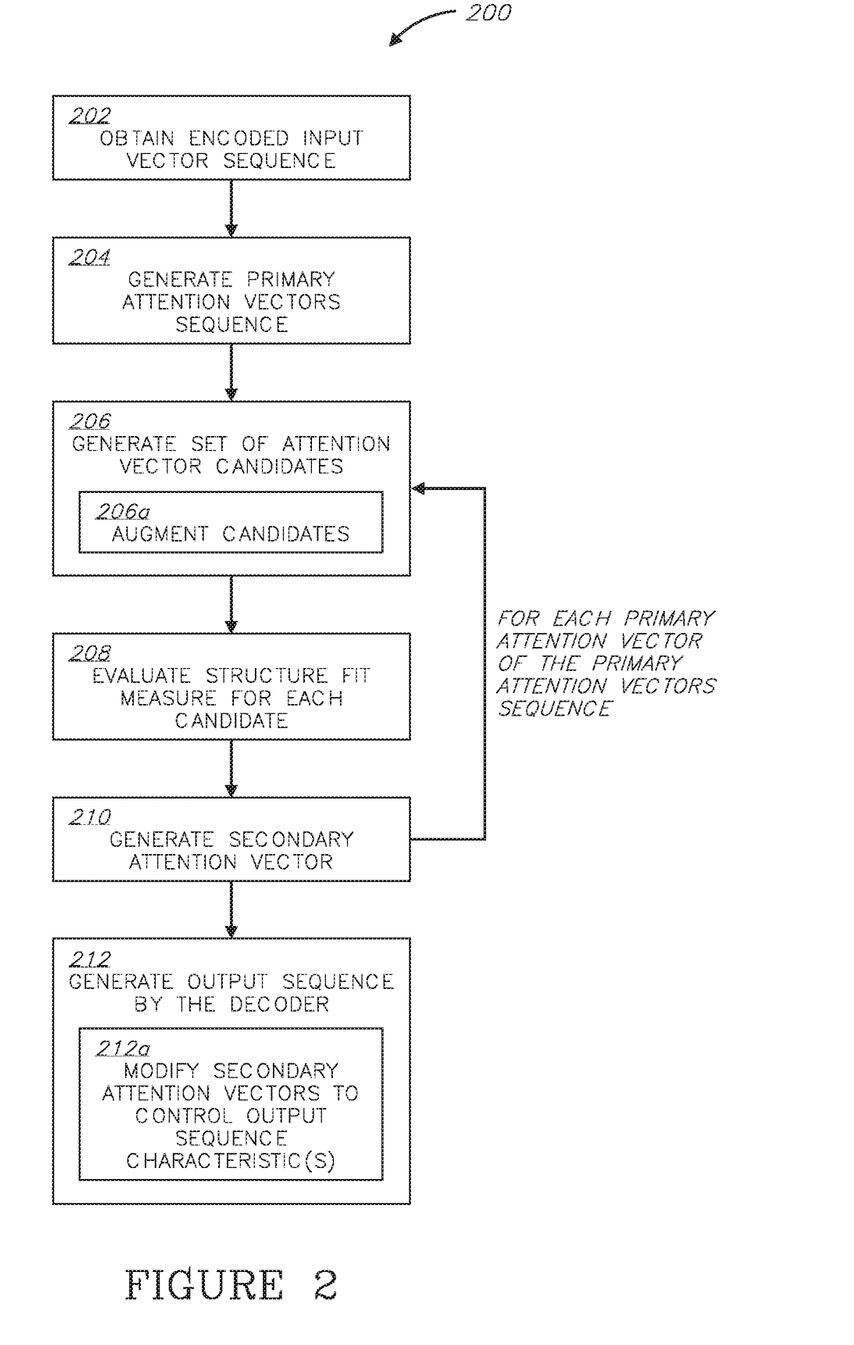
FIG. 2 is a flowchart of an exemplary method for operating a seq2seq ANN, according to an embodiment.

The instructions of seq2seq ANN module 108 are now discussed with reference to the flowchart of FIG. 2, which illustrates a method 200 for operating a seq2seq ANN, in accordance with an embodiment. For simplicity of presentation, method 200 is described from an inference point-of-view; it refers to the operation of an already-trained attentive decoder (hereinafter "decoder" for short) of the seq2seq ANN, as that decoder obtains an encoded input vector sequence from an encoder of the seq2seq ANN, and finally generates an output sequence. To train that decoder, essentially the same steps of method 200 may be performed, except with training data fed to the encoder. Also, in case the decoder is autoregressive, then "teacher forcing" training may be used, as known in the art.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

In a step 202, an encoded input vector sequence may be obtained from an encoder of the seq2seq ANN, as known in the art.

In a step 204, a primary attention vectors sequence may be generated using a trained primary attention mechanism (optionally of the additive type) of the seq2seq ANN, as known in the art.

The following steps, numbers 206, 208, and 210, may be repeated for each primary attention vector of the primary attention vectors sequence that was generated in step 204. Steps 206, 208, and 210 may jointly constitute the secondary attention mechanism of present embodiments, which mechanism is put to use in a step 212, of generating an output sequence.

In a step 206, a set of attention vector candidates (hereinafter "candidates") may be generated, using the trained primary attention mechanism, for each primary attention vector of the primary attention vectors sequence. This is done so that a candidate that best fits a desired attention vector structure can later be chosen.

The generation of the set of candidates may include obtaining one or more of the following vectors to serve as members of the set: a current primary attention vector, namely—the respective primary attention vector of the current repetition, that was provided by the primary attention mechanism at the present time step of the decoder's operation; a set of one or more previous primary attention vectors, namely—primary attention vectors of one or more previous repetitions, provided by the primary attention mechanism at one or more previous time steps of the decoder's operation; and a set of one or more previous secondary attention vectors, namely—secondary attention vectors selected as secondary attention vectors (see step 210 below) in one or more previous repetitions, provided by the secondary attention mechanism in previous time steps of the decoder's operation.

In a sub-step 206a, the obtained candidates are optionally augmented with one or more additional attention vectors, to increase the number of candidates available for evaluation in the next step of the method. One option to generate additional attention vectors is to shuffle and/or shift (either with cyclic rotation or zero padding) the contents of one or more of the obtained candidates. As a simplistic example, the contents of the vector ⟨9, 12, 23, 45⟩ can be randomly shuffled to ⟨23, 9, 12, 45⟩ or linearly shifted (with zero padding) by one index location, to ⟨0, 9, 12, 23⟩. A further option is to generate additional attention vectors by adding random noise to the contents of one or more of the obtained candidates. Yet another option to generate additional attention vectors is to calculate them de novo, such that they comply with the desired attention matrix structure. For instance, if the desired structure is sparse and monotonous, then the calculated additional attention vectors may be sparse and unimodal, with each vector having its peak location (arg max) not lower than that of its preceding vector in the attention matrix.

In a step 208, a structure fit measure may be evaluated for each candidate of the set of candidates that was obtained and optionally augmented in steps 206 and 206a (and, as before, this is done separately for every set of candidates that was generated for each primary attention vector of the primary attention vectors sequence). The structure fit measure may be a mathematical formula that quantifies a similarity of the respective candidate to the desired attention matrix structure. For example, the structure fit measure may indicate how closely each of the candidates complies with the desired structure, e.g., sparse and monotonous.

The evaluated structure fit measures may be given on any numerical scale, such as, merely as an example, on a scale of [0,1] (from no similarity at all, to identicalness).

In a step 210, a secondary attention vector may be generated based on the various candidates, the results of the evaluation of their structure fit measures, as well as on one or more state variables of the decoder. Due to the repetition of steps 206, 208, and 210 for each primary attention vector of the primary attention vectors sequence, the overall executions of step 210 result in multiple secondary attention vectors.

One way to generate the secondary attention vector is by soft-selection. The Examples section below describes two variants of a soft-selection module, a single-stage selection module and a hierarchical selection module, each being an embodiment of the present invention. Generally, both variants may use one or a series of trained sequential ANNs, which ultimately perform convex linear combination of the obtained candidate vectors (and optionally also of the augmented candidates), wherein the weights for the convex linear combination are generated by feeding the trained sequential ANNs with the evaluated structure fit measures of the candidates and with the decoder state variables (e.g., a previous input context vector, a hidden state vector of the decoder, etc.). Such sequential ANNs may be trained jointly with the main seq2seq network, preserving the main network's original training loss.

As an alternative to the hierarchical selection module, the secondary attention vector may be generated by hierarchically applying a binary gating mechanism to pairs of candidates, according to the respective structure fit measures of members of each pair.

Alternatively, the secondary attention vector may be selected or generated according to any criteria provided by a user of method 200, which considers the evaluated structure fit measures.

Lastly, in a step 212, an output sequence may be generated by the decoder, based on the secondary attention vectors generated in step 210 and the encoded input vector sequence obtained in step 202. The output sequence, depending on the task at hand (such the tasks listed in the background section, and others), may include any type of digital output, such as text, synthesized speech, media (images, video, audio, music), etc. In certain types of tasks, the output sequence requires another processing step to turn it into something meaningful to a user. For example, in TTS tasks, the output sequence is often a sequence of spectral audio features (represented by computer code) which require processing by a vocoder, as known in the art, in order to produce an audible waveform. To produce other types of media (such as images, video, audio, music, etc.), other types of encoders may be used to process the output sequence into the desired type of media.

Optionally, step 212 also includes a sub-step 212a of controlling, during inference, one or more characteristics of the decoder's output sequence. Namely, one or more parameters may be changed by the user before or during the generation of the output sequence, to cause a corresponding modification of the secondary attention vectors and subsequently of the output sequence. Such control may be realized by implementing a sub-mechanism in the secondary attention mechanism, which can receive the parameters from a source external to the decoder, and modify the secondary attention vectors accordingly.

Control over the decoder's output sequence characteristics may be beneficial, for example, in seq2seq neural TTS tasks, where the user may seek to modify prosody parameters of the speech that is synthesized from the output sequence. Prosody may reflect various features of the speaker or the utterance: the emotional state of the speaker; the form of the utterance (statement, question, or command); the presence of irony or sarcasm; emphasis, contrast, and focus. It may otherwise reflect other elements of language that may not be encoded by grammar or by choice of vocabulary. Exemplary prosody parameters include intonation (tonality, tonicity, tone, pitch range, key), stress (pitch prominence, length, loudness, timbre), tempo, rhythm, pauses, and chunking. In addition or as an alternative to prosody, other types of audio characteristics of the synthesized speech may be controlled.

EXAMPLES

An exemplary algorithm that implements method 200 (of FIG. 2) is provided below. It is not intended to limit method 200 to any specifics, but rather to provide such specifics as additional embodiments of the methods various steps.

Figure 3:
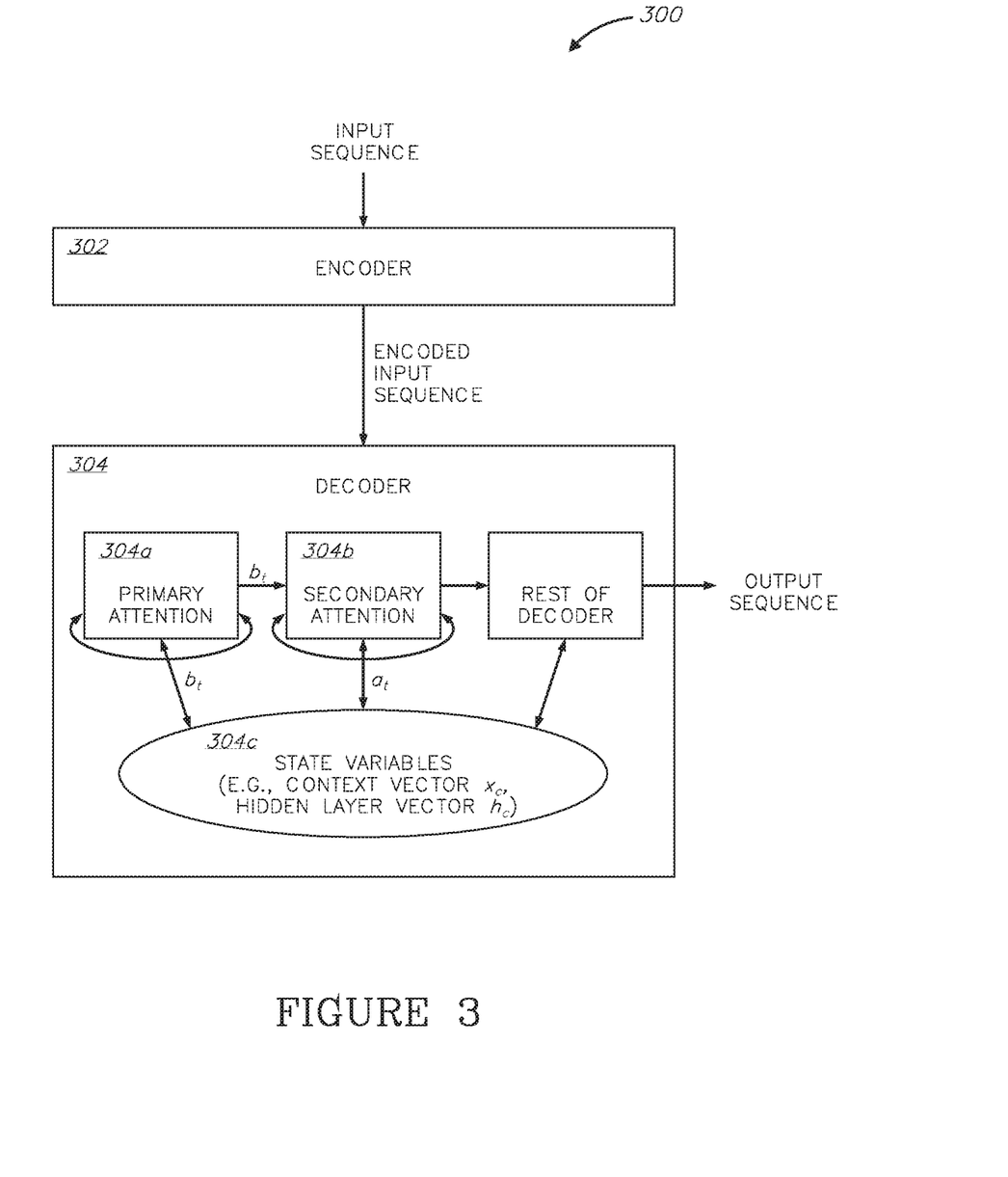
FIG. 3 is a diagram of an exemplary encoder-decoder configuration of a seq2seq ANN model, according to an embodiment.

The exemplary algorithm is described with reference to FIG. 3, which is a block diagram illustrating a seq2seq ANN 300 having an encoder 302 and a decoder 304.

Let t be a current time step of the decoder's operation. The exemplary algorithm employs a secondary attention mechanism 304b, substituting a primary attention mechanism 304a of the decoder. The secondary attention mechanism 304b derives the $t^{th}$ alignment vector $a_t$ from W previously obtained alignment vector candidates, e.g., a continuous set $\{c_j = a_{t-j}\}_{j=1}^{W}$, conditioned on the decoder state variables 304c and the encoded input sequence.

Optionally, there exists an extra "back off" candidate, that equals to the initial $t^{th}$ alignment vector candidate, $c_0 = a_{init,t}$.

From each alignment vector candidate $\{c_j\}_{j=1}^{W}$, an augmented set of alignment vector candidates is generated, for instance by shuffling or shifting of its components. For example, augmentation by linear shifting can be: $\{c_{j,k} = c_j[n-k]\}_{k=0}^{K_j}$, where n is an input sequence index, and boundary conditions for the shifting are appropriately set (e.g., by zero padding). The augmentation can be random or determined based on prior knowledge on a desired attention weight structure.

Next, for each alignment vector candidate $\{\{c_{j,k}\}_{k=0}^{K_j-1}\}_{j=0}^{W}$ (including the "back off" candidate, for which the augmented set is trivial, i.e., includes the original candidate only) a differentiable structure fit measure $s_{j,k}=f(c_{j,k})$ is evaluated. In one variant of the exemplary algorithm, the structure fit measure is determined by the original alignment vector candidate only (prior to the augmentation), i.e. $s_{j,k}=f(c_j)$.

In another variant, the structure fit measure includes a LogSumExp smooth maximum operator, combined with a "peakiness" criterion, evaluated by a ratio of L2-norm to L1-norm (that equals to L2-norm because, for the alignment candidate, L1-norm always equals to unity). This also ensures that the combined criterion of the structure fit measure is in range [0,1], where 1 means the perfect fit and 0 means the worst fit. The exemplary formula proposed for f(c) is given by:

$$f(c) = Thresh(f_1(c)f_2(c)), \text{ where}$$

$$f_1(c) = 0.1 \cdot \log \sum_{n=0}^{N-1} \exp(10 \cdot c[n]),$$

$$f_2(c) = \min\left(1.67 \cdot \left(\frac{N \cdot norm_2^2(c)}{(N-1)} - \frac{1}{N-1}\right), 1\right), \text{ and}$$

$$Thresh(x) = \begin{cases} x, & x > 0.12 \\ 0, & \text{else} \end{cases}.$$

This criterion favors a maximally-sparse unimodal probability distribution (i.e., a delta function). Another known alternative for the "peakiness" criterion is kurtosis, that can be used as an alternative.

The full augmented set of alignment vector candidates $\{\{c_{j,k}\}_{k=0}^{K_j-1}\}_{j=0}^{W}$ is fed into a trainable and differentiable candidate selection module, that outputs the final alignment vector $a_t$. The candidate selection module is conditioned on the decoder state variables. It also utilizes the evaluated structure fit measure to favor a properly structured candidate. Variants of the exemplary algorithm include either a single stage selection module or a hierarchical selection module, that both deploy the following alignment vector structure fit conditioning:

Let $\widehat{log}(x)$ be a confined log(x), e.g., $\widehat{log}(x)=\min(\log(x), -100)$. Then, for a set of candidate structure fit measures $s_{j,k}=f(c_{j,k})$, there is defined a set of candidate structure fit conditioning components:

$$S_{j,k} = \begin{cases} \widehat{log}(s_{j,k}), & j \neq 0 \\ \widehat{log}(s_{j,0}) + \sum_{i \neq 0, k} \widehat{log}(1 - s_{i,k}), & j = 0 \end{cases},$$

such that the evaluated structure fit measures are mapped in a predefined manner from their original [0,1] range to a broader range [−100,0]. Other broader ranges are also possible to use, of course.

As an alternative to such predefined mapping, a mapping may be performed by feeding the structure fit measures into a trainable scalar mapping, implemented by an ANN, jointly trained with the rest of the decoder. This trained scalar mapping ANN then generates the structure fit conditioning components vector $S_{j,k}$.

As a further alternative, the structure fit measure may itself be formed such that it provides evaluation results in a range broader than [0,1], so that no additional mapping is required.

The variant with the single-stage selection module may operate as follows:

Let K be an amount of all the alignment vector candidates $c_{j,k}$, i.e., $K=1+\Sigma_{j=1}^{W}K_j$, and S be a vector of the corresponding candidate structure fit conditioning components. Then, there are K candidate selection weights $\{\alpha_{j,k}\}$ and they are evaluated with a trained multi-layer sequential ANN with alternating linear and non-linear layers and a terminating linear layer, fed by the decoder state variables. The K-dimensional vector output of this evaluation (specifically, output by the terminating linear layer) is added to the conditioning vector S, and a resultant interim vector is fed to a softmax layer with K weight outputs, $\{\alpha_{j,k}\}$. Then, the secondary alignment vector is formed by the soft-selection operation:

$$a_t = \Sigma_{j,k} \alpha_{j,k} c_{j,k},$$

such that the set of attention vector candidates $c_{j,k}$ are combined according to their weights.

The variant with the hierarchical selection module may operate as follows:

W separate subsets of alignment vector candidates $\{d_j\}_{j=}^{W}$ are defined, selected from the corresponding augmented alignment vectors sets $\{\{c_{j,k}\}_{k=0}^{K_j}\}_{j=1}^{W}$. For each of the W subsets, a process similar to that of the single-stage selection module is performed; however, instead of concluding with a secondary attention vector, what is ultimately formed for each subset is a single attention vector candidate (referred to as a "subset" attention vector candidate) that represents the best structurally-fitted attention vector for that subset. This also involves evaluating a structure fit measure for the subset attention vector candidate. Then, the structure fit measures for all subsets are processed using an additional trained sequential ANN, whose output is provided to a softmax layer to determine weights for the subset attention vector candidates. Finally, the secondary attention vector is formed by combining the intermediate attention vector candidates according to their weights.

More specifically, the $j^{th}$ soft-selection module (out of W such modules) predicts $K_j$ selection weights $\{\beta_k\}$ with a multi-layer sequential ANN having alternating linear and non-linear layers and a terminating linear layer, fed by the decoder state variables, and having its output further added to the corresponding subset of the structure fit conditioning S and passed through a softmax layer to obtain soft-selection weights $\beta_k$ for the $j^{th}$ subset. Further, the $j^{th}$ soft-selection of the intermediate vector candidate is performed by:

$$d_j = \Sigma_k \beta_k c_{j,k},$$

In addition, $d_0 = c_0$.

After all W soft-selection modules have concluded, a single attention vector candidate is selected out of W+1 intermediate attention vector candidates. Let (W+1) be an amount of the intermediate attention vector candidates $d_j$, and S be a vector of the corresponding candidate structure fit conditioning components $\{S_j\}$:

$$S_j = \begin{cases} \widehat{log}(f(c_j)), & j \neq 0 \\ \widehat{log}(f(c_j)) + \sum_{i \neq 0} \widehat{log}(1 - f(c_i)), & j = 0 \end{cases}.$$

Then, there are W+1 final candidate selection weights $\{\gamma_j\}$ and they are evaluated with a multi-layer sequential ANN with alternating linear and non-linear layers and a terminating linear layer, fed by the decoder state variables. The (W+1)-dimensional output of the terminating linear layer is added to the corresponding conditioning S, and the resultant output vector is fed to a softmax layer with (W+1) outputs, $\{\gamma_j\}$. Finally, the secondary alignment vector is formed by:

$$a_t = \Sigma_j \gamma_j d_j.$$

In a simplified use case of the hierarchical selection module, where W=1, $K_1$=2, a sigmoid can be used instead of softmax, as follows:

Here f(c) is the structure fit measure, $\beta_1$ and $\gamma_1$ are scalar transition probabilities, predicted with separate multi-layer sequential ANNs, fed by the decoder state variables and terminated with the sigmoid layer.

Then, $$d_1 = \beta_1 c_{1,1} + (1-\beta_1) c_{1,0}$$

$$a_t = (1-f(c_0))(1-f(c_1))\gamma_1 d_1 + f(c_0)(1-f(c_1))(1-\gamma_1)c_0.$$

Experimental Results

The disclosed structure-preserving secondary attention mechanism has been successfully tested in a seq2seq neural TTS task, and exhibited good alignment convergence during training as well as high MOS scores during user control over two TTS prosody parameters (speaking pace, speaking pitch) at inference time.

The experimental task followed the "Tacotron2" architecture (Shen, Jonathan, et al. "Natural TTS Synthesis by Conditioning Wavenet on MEL Spectrogram Predictions." 2018 IEEE International Conference on Acoustics, Speech and Signal Processing (ICASSP). IEEE, 2018), comprising a recurrent attentive sequence to sequence network for spectral feature prediction, cascaded with a Wavenet-like (Van Den Oord, Aäron et al. "WaveNet: A generative model for raw audio." SSW 125. 2016) neural vocoder (Tamamori, Akira et al. "Speaker-Dependent WaveNet Vocoder." INTERSPEECH. 2017), all with various advantageous modifications intended to improve the synthesized speech quality, training convergence, and sensitivity to the prosody control mechanism.

Male and female voice corpora was used, with a sampling rate of 22050 Hz. The male dataset contained 13 hours of speech and the female dataset contained 22 hours of speech. Both were produced by native U.S. English speakers and recorded in a professional studio. The audio was recorded utterance by utterance, where most of utterances contained a single sentence.

To facilitate the control over the prosody parameters, suitable training was performed based on prosody observations extracted from the recordings, and a mechanism to control these parameters using a component-wise offset in a [−1,1] range was embedded. At inference time, the prosody parameters were predicted from the encoded output sequence and could be deliberately offset by the user for generation of the output sequence and subsequently of the output waveform.

Being aware of the desired alignment matrix structure for this particular TTS task (monotonic alignment evolvement), a set of alignment vector candidates was derived from the previous alignment vectors, in addition to the primary current alignment vector. Then, a soft-selection was applied, to obtain the secondary alignment vector in such a way that its expected, desired structure (namely, a unimodal shape with a sharp peak) is preserved.

Let $b_t$ be the initial alignment vector, as evaluated by the initial attention module and $a_t[n]$ be a secondary alignment vector at output time step t. Assuming the monotonic attention of Raffel, Colin, et al. "Online and linear-time attention by enforcing monotonic alignments." Proceedings of the 34th International Conference on Machine Learning-Volume 70. JMLR. org, 2017, without skipping input symbols, a candidate set $\{c_k\}_{k=0}^2$ was created by adding the previous alignment vector $a_{t-1}[n]$ together with its shifted version $a_{t-1}[n-1]$ to the current initial alignment $b_t$ at the current time step t:

$$\{c_k\}_{k=0}^2 = \{b_t, a_{t-1}[n], a_{t-1}[n-1]\} \quad (1)$$

This augmentation assumes that at the current time the output either stays aligned to the previous input symbol or moves to the next one.

Having this set of candidates, one could just train a soft-selection to come up with the secondary alignment vector, but, as a precaution, the experiment aimed to ensure that the soft-selector prefers properly structured candidates to eliminate occasional attention corruption. To that end, a scalar structure metric was used as the structure fit measure, that assesses the unimodality and the peak sharpness of the alignment vector candidate. The measure combined a LogSumExp soft maximum assessment with an additional peak sharpness metric derived from the common "peakiness" metric of McCree A V, Barnwell T P. "A mixed excitation LPC vocoder model for low bit rate speech coding." IEEE Transactions on Speech and audio Processing. 1995 July; 3(4):242-50, i.e., L2-norm divided by L1-norm, noting that L1-norm always equals unity for the alignment vectors and the squared L2-norm of the worst-case flat alignment vector equals to 1/N. A boost constant 1.67 was experimentally set to reduce the sensitivity of this metric.

The combined structure metric used in the experiment is given by:

$$f(c) = \lfloor f_1(c) f_2(c) \rfloor_{0.12} \text{ where} \quad (2)$$

$$f_1(c) = 0.1 \cdot \log \sum_{n=0}^{N-1} \exp(10 \cdot c[n]), \quad (3)$$

$$f_2(c) = \min\left(1.67 \cdot \left(\frac{N \cdot \|c\|_2^2}{(N-1)} - \frac{1}{N-1}\right), 1\right), \quad (4)$$

and the thresholding operator $\lfloor x \rfloor_\alpha$ is defined as:

$$\lfloor x \rfloor_\alpha \equiv \begin{cases} x, & x > \alpha \\ 0, & \text{else} \end{cases}$$

The added thresholding operation, with the experimentally set near-zero threshold of 0.12, came to ensure that bad alignment vector candidates do not fit for the soft-selection.

The structure-preserving soft-selection of the alignment vector was performed in two stages. The first stage is given by:

$$d = \alpha a_{t-1}[n-1] + (1-\alpha) a_{t-1}[n], \quad (5)$$

where $\alpha$ is a scalar initial stage selection weight, generated by a single fully connected layer, fed with the concatenated decoder state variables ($x_c$, $h_c$) and terminated with the sigmoid layer. Observing the first stage selection (5), one can note that it provides an explicit phoneme transition control by the embedded prosody parameters, which is a part of the input context vector.

The final stage of the selection procedure utilizes the structure metric f(c):

$$a_i=(1-\gamma)\beta d+\gamma(1-\beta)b_i, \quad (6)$$

where β is a scalar final stage selection weight, generated by a single fully connected layer, fed with the input context vector $x_c$ and terminated with the sigmoid layer, and $\gamma=f(b_i)$ (1−f(d)) is a structure preference score. This multiplicative structure preference score ensures that the initial attention vector will be considered only if its structure is preferable over the other candidate.

In the experiment, at inference, a Wavenet-style vocoder (Van Den Oord et al. and Tamamori et al., Ibid.) was used to generate an output waveform from spectral features predicted by the model.

Figure 4:
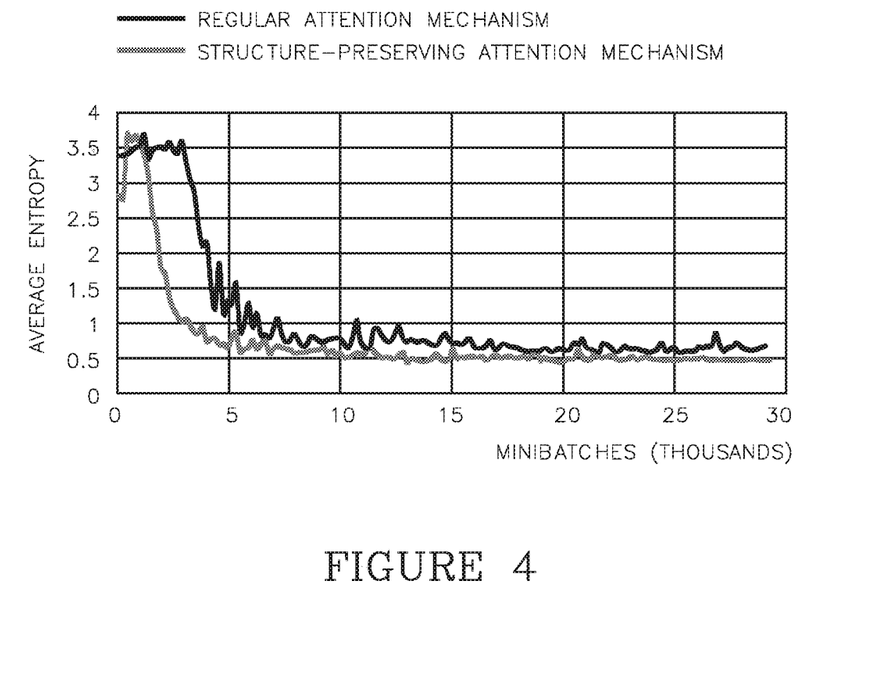
FIG. 4 is a graph comparing average alignment vector entropy of two attention mechanisms, according to experimental results.

The experiment showed improvement in the alignment convergence during training, as can be seen in FIG. 4. This figure shows the average alignment vector entropy of a 100-sentences validation set during the training on a data corpus of 13,000 sentences. The minibatch size was 48. The average alignment vector entropy with the structure-preserving attention mechanism of the present invention was lower than that of just the regular attention mechanism (the pre-existing attention mechanism of the model).

To assess the quality and expressiveness of the output waveform created based on the structure-preserving attention mechanism, two formal MOS listening tests (one per voice corpus, male and female) were performed on 40 synthesized sentences. Each test rated four systems: a first system that uses the present structure-preserving attention mechanism (denoted AugAttn in the tables below), and three benchmark systems: an original, unmodified voice recording (denoted PCM); an output waveform of the same model but with just the primary attention mechanism (denoted RegAttn); and an output waveform of the "WORLD" system of Morise Masanori, Fumiya Yokomori, and Kenji Ozawa. "WORLD: A Vocoder-Based High-Quality Speech Synthesis System for Real-Time Applications." IEICE Transactions on Information and Systems 99.7 (2016): 1877-1884 (denoted WORLD). The AugAttn system was rated three times: once without any prosody control (pace and pitch at 0,0), and twice with differing pace and pitch controls. Each of the synthesized sentences was rated by 25 distinct subjects.

Tables 1 and 2 list the results of the MOS evaluation for naturalness and expressiveness for the female and the male voices, respectively. The significance analysis for the results in Table 1 revealed that most of cross-system expressiveness differences are statistically significant, except for the difference between RegAttn and AugAttn(0,0) and the difference between RegAttn(−0.1,0.5) and AugAttn(0.15,0.6). In terms of naturalness, all the augmented attention systems performed like RegAttn (no significant difference), except of RegAttn(−0.1,0.5) that performed slightly better (p=0.046). So, for the female voice, the prosody control was able to significantly improve the perceived expressiveness, while preserving the original quality and naturalness.

Similarly, the significance analysis for the male voice (Table 2) revealed that only the pair RegAttn and AugAttn (0,0), as well as the pair RegAttn(0.2,0.8) and AugAttn(0.5, 1.5) are equivalent in terms of perceived expressiveness. In terms of naturalness, both RegAttn(0.2,0.8) and AugAttn (0.5,1.5) provide significant improvement, compared to RegAttn(0,0) and RefAttn. Namely, for the male voice, the prosody control was able to significantly improve expressiveness, quality and naturalness altogether.

TABLE 1

MOS Evaluation for Naturalness and Expressiveness for U.S. English female voice (µ ± 95%)

| | | | | AugAttn(pace, pitch) | | |
|---|---|---|---|---|---|---|
| MOS | PCM | WORLD | RegAttn | (0, 0) | (−0.1, 0.5) | (0.15, 0.6) |
| Nat. | 4.17 ± 0.06 | 3.00 ± 0.09 | 3.86 ± 0.06 | 3.86 ± 0.06 | 3.93 ± 0.06 | 3.93 ± 0.06 |
| Expr. | 4.27 ± 0.05 | 3.22 ± 0.08 | 3.88 ± 0.06 | 3.83 ± 0.06 | 4.04 ± 0.06 | 4.01 ± 0.06 |

TABLE 2

MOS Evaluation for Naturalness and Expressiveness for U.S. English male voice (µp ± 95%)

| | | | | AugAttn(pace, pitch) | | |
|---|---|---|---|---|---|---|
| MOS | PCM | WORLD | RegAttn | (0, 0) | (0.2, 0.8) | (0.5, 1.5) |
| Nat. | 4.09 ± 0.05 | 2.58 ± 0.07 | 3.68 ± 0.06 | 3.71 ± 0.05 | 3.81 ± 0.05 | 3.81 ± 0.05 |
| Expr. | 4.20 ± 0.05 | 2.97 ± 0.06 | 3.76 ± 0.05 | 3.74 ± 0.05 | 3.88 ± 0.05 | 3.93 ± 0.05 |

To conclude, the experimentation revealed that the structure-preserving attention mechanism of the present invention, applied in a seq2seq neural TTS system, preserves high quality and naturalness both with and without control of prosody at inference time. Those of skill in the art will recognize that similar results are most likely attainable in other types of seq2seq neural tasks, such as machine translation, speech recognition, video captioning, text summarization, textual entailment, question answering, chat bots, and others.

The above-discussed techniques that were used in the experiments are considered embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, in a trained attentive decoder of a trained Sequence-to-Sequence (seq2seq) Artificial Neural Network (ANN):
   obtaining an encoded input vector sequence;
   generating, using a trained primary attention mechanism of the trained attentive decoder, a primary attention vectors sequence;
   for each primary attention vector of the primary attention vectors sequence:
   (a) generating a set of attention vector candidates corresponding to the respective primary attention vector,
   (b) evaluating, for each attention vector candidate of the set of attention vector candidates, a structure fit measure that quantifies a similarity of the respective attention vector candidate to a desired attention vector structure,
  (c) generating, using a trained soft-selection ANN, a secondary attention vector based on said evaluation and on state variables of the trained attentive decoder; and
generating, using the trained attentive decoder, an output sequence based on the encoded input vector sequence and the secondary attention vectors.

2. The method according to claim 1, wherein said generating of the output sequence comprises:
generating input context vectors based on the encoded input vector sequence and on the secondary attention vectors; and
generating, using the trained attentive decoder, the output sequence based on the input context vectors.

3. The method according to claim 1, wherein said generating of the set of attention vector candidates comprises:
obtaining at least one of: a current primary attention vector, a set of previous primary attention vectors, and a set of previous secondary attention vectors; and
augmenting the at least one obtained vector with additional attention vectors, by at least one of shuffling and shifting the contents of the at least one obtained vector.

4. The method according to claim 1, wherein said generating of the set of attention vector candidates comprises:
obtaining at least one of: a current primary attention vector, a set of previous primary attention vectors, and a set of previous secondary attention vectors; and
augmenting the at least one obtained vector with additional attention vectors, by calculating the additional attention vectors to comply with the desired attention vector structure.

5. The method according to claim 1, wherein the structure fit measure is based on at least one of: a smooth maximum, kurtosis, skewness, entropy, a ratio between L2-norm and L1-norm.

6. The method according to claim 1, wherein said generating of the secondary attention vector comprises:
applying scalar mapping to the evaluated structure fit measures, to produce a mapped structure fit measures vector;
providing a trained sequential ANN having: alternating linear and non-linear layers, and a terminating linear layer;
applying the trained sequential ANN to the state variables of the trained attentive decoder, and adding an output vector of said applying to the mapped structure fit measures vector, to produce an interim vector;
providing the interim vector to a softmax layer, to produce weights for the set of attention vector candidates; and
forming the secondary attention vector by combining the set of attention vector candidates according to their weights.

7. The method according to claim 1, wherein said generating of the secondary attention vector comprises:
applying scalar mapping to the evaluated structure fit measures, to produce mapped structure fit measures;
defining multiple subsets of attention vector candidates and their corresponding mapped structure fit measures;
for each of the multiple subsets:
  providing a trained sequential ANN having: alternating linear and non-linear layers, and a terminating linear layer,
  applying the trained sequential ANN to the state variables of the trained attentive decoder, and adding an output vector of said applying to the mapped structure fit measures of the respective subset, to produce an interim vector,
  providing the interim vector to a softmax layer, to produce weights for the subset of attention vector candidates,
  forming a subset attention vector candidate by combining the attention vector candidates of the respective subset according to their weights,
  evaluating, for the subset attention vector candidate, a subset structure fit measure that quantifies a similarity of the subset attention vector candidate to a desired attention vector structure, and
  applying scalar mapping to the evaluated subset structure fit measure, to produce a mapped subset structure fit measure;
providing an additional trained sequential ANN having: alternating linear and non-linear layers, and a terminating linear layer;
applying the additional trained sequential ANN to the state variables of the trained attentive decoder, and adding an output vector of said applying of the additional trained sequential ANN to a vector of the mapped subset structure fit measures, to produce an intermediate vector;
providing the intermediate vector to a softmax layer, to produce weights for the subset attention vector candidates; and
forming the secondary attention vector by combining the subset attention vector candidates according to their weights.

8. The method according to claim 1, wherein the trained primary attention mechanism is an additive attention mechanism.

9. The method according to claim 1, wherein the seq2seq ANN is configured for a text-to-speech task, and the method further comprises:
operating a vocoder to synthesize speech from the output sequence; and
modifying the secondary attention vector before or during said generating of the output sequence, to affect at least one prosody parameter of the synthesized speech.

10. The method according to claim 9, wherein the at least one prosody parameter is selected from the group consisting of: intonation, stress, tempo, rhythm, pauses, and chunking.

11. The method according to claim 1, further comprising receiving a definition of the desired attention vector structure from a user.

12. A system comprising:
(i) at least one hardware processor; and
(ii) a non-transitory computer-readable storage medium having program code embodied therewith, the program code executable by said at least one hardware processor to perform the following instructions in a trained attentive decoder of a trained Sequence-to-Sequence (seq2seq) Artificial Neural Network (ANN):
obtaining an encoded input vector sequence,
generating, using a trained primary attention mechanism of the trained attentive decoder, a primary attention vectors sequence,
for each primary attention vector of the primary attention vectors sequence:
  (a) generating a set of attention vector candidates corresponding to the respective primary attention vector,
  (b) evaluating, for each attention vector candidate of the set of attention vector candidates, a structure fit measure that quantifies a similarity of the respective attention vector candidate to a desired attention vector structure, (c) generating, using a trained soft-selection ANN, a secondary attention vector based on said evaluation and on state variables of the trained attentive decoder, and generating, using the trained attentive decoder, an output sequence based on the encoded input vector sequence and the secondary attention vectors.

13. The system according to claim 12, wherein said generating of the output sequence comprises:

generating input context vectors based on the encoded input vector sequence and on the secondary attention vectors; and generating, using the trained attentive decoder, the output sequence based on the input context vectors.

14. The system according to claim 12, wherein said generating of the set of attention vector candidates comprises:

obtaining at least one of: a current primary attention vector, a set of previous primary attention vectors, and a set of previous secondary attention vectors; and augmenting the at least one obtained vector with additional attention vectors, by at least one of shuffling and shifting the contents of the at least one obtained vector.

15. The system according to claim 12, wherein said generating of the set of attention vector candidates comprises:

obtaining at least one of: a current primary attention vector, a set of previous primary attention vectors, and a set of previous secondary attention vectors; and augmenting the at least one obtained vector with additional attention vectors, by calculating the additional attention vectors to comply with the desired attention vector structure.

16. The system according to claim 12, wherein the structure fit measure is based on at least one of: a smooth maximum, kurtosis, skewness, entropy, a ratio between L2-norm and L1-norm.

17. The system according to claim 12, wherein said generating of the secondary attention vector comprises:

applying scalar mapping to the evaluated structure fit measures, to produce a mapped structure fit measures vector;

providing a trained sequential ANN having: alternating linear and non-linear layers, and a terminating linear layer;

applying the trained sequential ANN to the state variables of the trained attentive decoder, and adding an output vector of said applying to the mapped structure fit measures vector, to produce an interim vector;

providing the interim vector to a softmax layer, to produce weights for the set of attention vector candidates; and forming the secondary attention vector by combining the set of attention vector candidates according to their weights.

18. The system according to claim 12, wherein said generating of the secondary attention vector comprises:

applying scalar mapping to the evaluated structure fit measures, to produce mapped structure fit measures;

defining multiple subsets of attention vector candidates and their corresponding mapped structure fit measures;

for each of the multiple subsets:

providing a trained sequential ANN having: alternating linear and non-linear layers, and a terminating linear layer, applying the trained sequential ANN to the state variables of the trained attentive decoder, and adding an output vector of said applying to the mapped structure fit measures of the respective subset, to produce an interim vector, providing the interim vector to a softmax layer, to produce weights for the subset of attention vector candidates, forming a subset attention vector candidate by combining the attention vector candidates of the respective subset according to their weights, evaluating, for the subset attention vector candidate, a subset structure fit measure that quantifies a similarity of the subset attention vector candidate to a desired attention vector structure, and applying scalar mapping to the evaluated subset structure fit measure, to produce a mapped subset structure fit measure;

providing an additional trained sequential ANN having: alternating linear and non-linear layers, and a terminating linear layer;

applying the additional trained sequential ANN to the state variables of the trained attentive decoder, and adding an output vector of said applying of the additional trained sequential ANN to a vector of the mapped subset structure fit measures, to produce an intermediate vector;

providing the intermediate vector to a softmax layer, to produce weights for the subset attention vector candidates; and forming the secondary attention vector by combining the subset attention vector candidates according to their weights.

19. The system according to claim 12, wherein the trained primary attention mechanism is an additive attention mechanism.

20. The system according to claim 12, wherein the program code is further executable by said at least one hardware processor to perform the following instruction:

receiving a definition of the desired attention vector structure from a user.

* * * * *